(12) United States Patent
Rahimi et al.

(10) Patent No.: US 9,418,251 B2
(45) Date of Patent: Aug. 16, 2016

(54) MESH GRID PROTECTION SYSTEM

(71) Applicant: Broadcom Corporation, Irvine, CA (US)

(72) Inventors: Kambiz Rahimi, Kirkland, WA (US); Mark Buer, Payson, AZ (US); Rolando Ogot, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/869,342

(22) Filed: Sep. 29, 2015

(65) Prior Publication Data

US 2016/0092703 A1    Mar. 31, 2016

Related U.S. Application Data

(63) Continuation of application No. 14/317,359, filed on Jun. 27, 2014, now Pat. No. 9,147,090, which is a continuation of application No. 13/626,394, filed on Sep. 25, 2012, now Pat. No. 8,776,260.

(51) Int. Cl.
*G06F 21/00* (2013.01)
*G06F 21/87* (2013.01)

(52) U.S. Cl.
CPC ..................................... *G06F 21/87* (2013.01)

(58) Field of Classification Search
CPC ......... G06F 21/86; G06F 21/87; G06F 21/57; G06F 21/88; G06F 21/83; G06F 2221/2101; G06F 2221/2143; H04L 9/0618; H04L 2209/12; H04L 2209/127; H01L 23/576; G09C 1/00

USPC ............................................................ 726/34
See application file for complete search history.

(56) References Cited

U.S. PATENT DOCUMENTS

| 4,833,618 | A | 5/1989 | Verma et al. |
| 5,288,949 | A | 2/1994 | Crafts |

(Continued)

FOREIGN PATENT DOCUMENTS

| EP | 0 268 142 A2 | 5/1988 |
| EP | 1 670 059 A1 | 6/2006 |
| WO | WO 2007/091210 A2 | 8/2007 |

OTHER PUBLICATIONS

Ward, E., Cryptanalysis of the GSM Algorithms, posted Nov. 24, 2004 at <http://geocities.com/eoinward/images/1.html>, now available at <http://www.oocities.org/eoinward/gsmfirsthalf.pdf>, 54 pages.

(Continued)

*Primary Examiner* — Yogesh Paliwal
(74) *Attorney, Agent, or Firm* — Sterne, Kessler, Goldstein & Fox PLLC

(57) ABSTRACT

A mesh grid protection system is provided. The system includes assertion logic configured to transmit a first set of signals on a first set of grid lines and a second set of grid lines. The system also includes transformation logic to transform the first set of signals to generate a second set of signals, to transmit the second set of signals on a third set of grid lines that are coupled to the first set of grid lines, and to transmit the second set of signals on a fourth set of grid lines that are coupled to the second set of grid lines. In addition, the system includes verification logic to compare the second set of signals on the third and fourth set of grid lines to an expected set of signals.

20 Claims, 15 Drawing Sheets

(56) References Cited

U.S. PATENT DOCUMENTS

| | | | |
|---|---|---|---|
| 5,861,662 | A | 1/1999 | Candelore |
| 6,496,119 | B1 | 12/2002 | Otterstedt et al. |
| 7,158,986 | B1 | 1/2007 | Oliver et al. |
| 7,343,626 | B1 | 3/2008 | Gallagher |
| 7,539,632 | B1 | 5/2009 | Chakrabarti et al. |
| 7,723,998 | B2 * | 5/2010 | Doi .................... G06F 21/75 324/555 |
| 7,836,051 | B1 | 11/2010 | Mason |
| 7,925,691 | B2 | 4/2011 | Westphal |
| 8,776,260 | B2 | 7/2014 | Rahimi et al. |
| 9,147,090 | B2 | 9/2015 | Rahimi et al. |
| 2004/0227549 | A1 | 11/2004 | Solie |
| 2005/0102358 | A1 | 5/2005 | Gold et al. |
| 2006/0123376 | A1 | 6/2006 | Vogel et al. |
| 2006/0195442 | A1 | 8/2006 | Cone et al. |
| 2006/0253579 | A1 | 11/2006 | Dixon et al. |
| 2006/0253583 | A1 | 11/2006 | Dixon et al. |
| 2007/0011023 | A1 | 1/2007 | Silverbrook |
| 2007/0155328 | A1 | 7/2007 | Turner |
| 2007/0257683 | A1 * | 11/2007 | Matsuno ............... G06F 21/87 324/537 |
| 2008/0109473 | A1 | 5/2008 | Dixon et al. |
| 2008/0126176 | A1 | 5/2008 | Iguchi |
| 2008/0172382 | A1 | 7/2008 | Prettejohn |
| 2009/0024605 | A1 | 1/2009 | Yang |
| 2009/0077669 | A1 * | 3/2009 | Buer ..................... G06F 21/86 726/26 |
| 2009/0112974 | A1 | 4/2009 | Ravikumar et al. |
| 2009/0216577 | A1 | 8/2009 | Killebrew |
| 2009/0222907 | A1 | 9/2009 | Guichard |
| 2014/0090093 | A1 | 3/2014 | Rahimi et al. |

OTHER PUBLICATIONS

Non-Final Office Action, dated Jan. 3, 2012, for U.S. Appl. No. 12/210,013, filed Sep. 12, 2008, 11 pages.
Final Office Action, dated Aug. 3, 2012, for U.S. Appl. No. 12/210,013, filed Sep. 12, 2008, 8 pages.
Non-Final Office Action, dated Feb. 13, 2013, for U.S. Appl. No. 12/210,013, filed Sep. 12, 2008, 9 pages.
Final Office Action, dated Jun. 20, 2013, for U.S. Appl. No. 12/210,013, filed Sep. 12, 2008, 9 pages.
Final Office Action, dated Nov. 5, 2013, for U.S. Appl. No. 12/210,013, filed Sep. 12, 2008, 13 pages.
Examiner's Answer, dated Sep. 4, 2014, for U.S. Appl. No. 12/210,013, filed Sep. 12, 2008, 11 pages.
International Search Report for International Application No. PCT/US 08/10705, United States Patent and Trademark Office, Alexandria, VA, United States, mailed on Dec. 8, 2008, 1 page.
International Preliminary Report on Patentability with Written Opinion of the International Searching Authority for International Application No. PCT/US2008/010705, The International Bureau of WIPO, Geneva, Switzerland, issued on Mar. 16, 2010, 6 pages.
Supplementary European Search Report, dated Jul. 29, 2011, for European Patent Appl. No. 08830241.9, 7 pages.

* cited by examiner

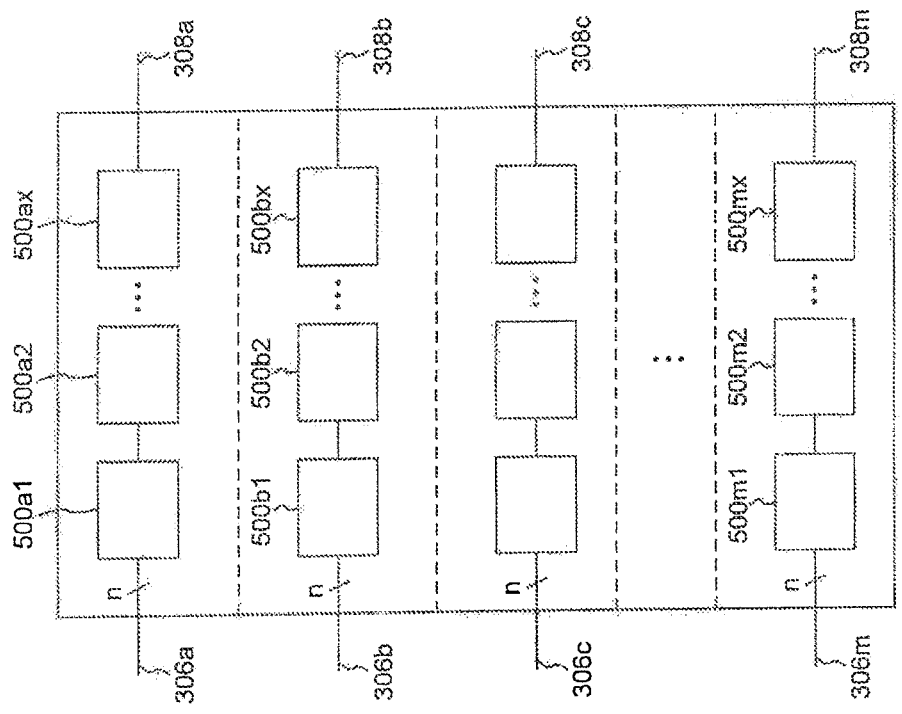
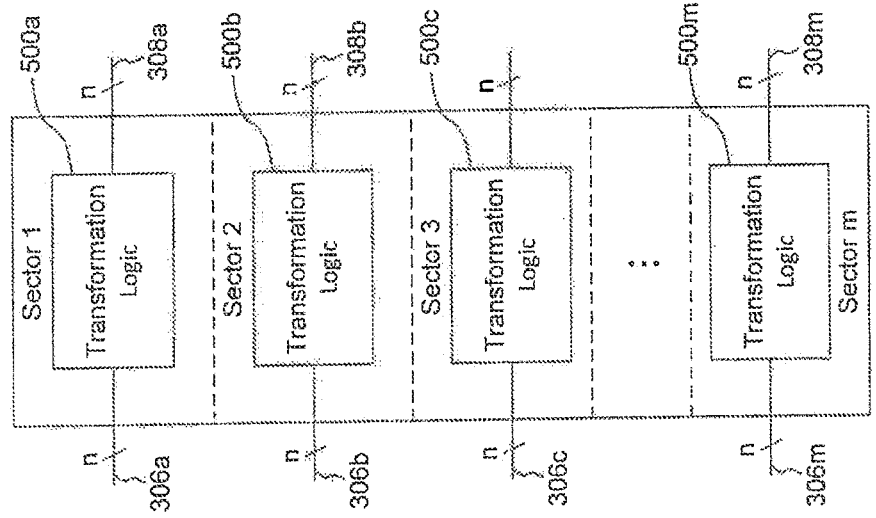

MESH GRID PROTECTION SYSTEM

CROSS-REFERENCE TO RELATED APPLICATION

This application is a continuation of U.S. patent application Ser. No. 14/317,359, filed on Jun. 27, 2014, now U.S. Pat. No. 9,147,090, which is a continuation of U.S. patent application Ser. No. 13/626,394, filed on Sep. 25, 2012, now U.S. Pat. No. 8,776,260, all of which are incorporated herein by reference in their entireties.

BACKGROUND OF THE INVENTION

1. Field of the Invention

This invention generally relates to mesh grid protection for circuits.

2. Background Art

Logic circuits and memory on electronic devices such as integrated circuit (IC) chips (also referred to as an "IC" or "chip" herein) are vulnerable to hardware hacking. Integrated circuits storing or utilizing secure data such as cryptographic keys or other user sensitive data such as credit card numbers are particularly targeted. One style of hardware hacking involves penetrating an IC enclosure or package to physically access the internal logic circuitry and/or memory of the IC. In these attacks, the package is opened from the top or bottom and any encapsulating material is removed or etched away. The hacker can then access the internal logic circuitry and/or memory of the IC using a probe. The hacker can read signals in the internal logic circuitry or memory of the IC to derive secure data or can in some cases access restricted data directly. In other techniques, hardware hackers set up probes to read pins of chips in point-of-sale terminals and Automated Teller Machines (ATMs) to access credit card information.

Methods, systems, and computer program products are therefore needed to improve the physical security of devices.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 11A and 11B illustrate example implementations of transformation logic according to embodiments of the disclosure.

The present embodiments will now be described with reference to the accompanying drawings. In the drawings, like reference numbers may indicate identical or functionally similar elements.

DETAILED DESCRIPTION OF THE INVENTION

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

The present disclosure describes system and methods for protecting data in logic circuits using a mesh grid. The mesh grid detects attempts to tamper with a package or circuit board. It will be understood that the essential concepts disclosed herein are applicable to a wide range of electronic circuits and systems, architectures and hardware elements.

Figure 1:
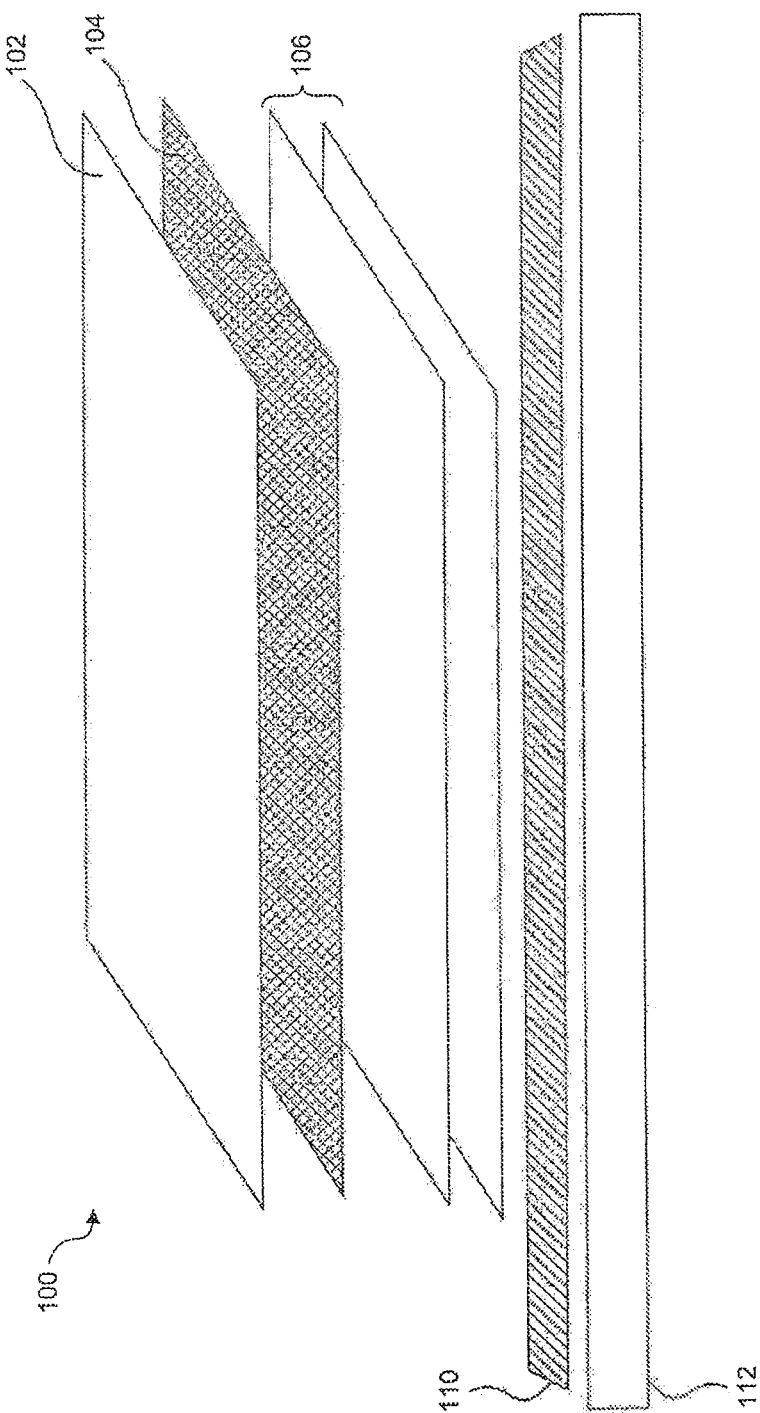
FIG. 1 illustrates a cross section of a mesh grid protection system.

FIG. 1 illustrates a cross section of a mesh grid protection system 100, according to an embodiment of the disclosure. Mesh grid protection system 100 may include a ground plane 102, an internal mesh grid 104, an optional external mesh grid layer 110 and one or more layers of protected logic circuits 106. In an embodiment, the ground plane 102 and/or protection mesh layer 104 are located at the redistribution (RDL) layer of a die of an integrated circuit (IC) chip (not shown.) In an embodiment, ground plane 102, internal mesh grid 104 and protected logic circuits 106 are located inside a package of the IC chip and external mesh grid 110 may be located either in a plastic shell (not shown) at the bottom layer of the package of the IC chip that includes the die or on a circuit board 112 below the package. In another embodiment, internal mesh grid 104 or external mesh grid 110 may be partially on the die that includes the protected logic layer 106 and partially in the plastic of a package of the IC chip that includes the die. It is to be appreciated by persons of skill in the art that the package may be made of other material than plastic based on implementation needs. It is also to be appreciated that a location of a mesh grid within a chip is a design choice and may be arbitrary. External mesh grid 110 and internal mesh grid 104 may be collectively referred to as a "mesh grid" herein.

An IC incorporating mesh protection system 100 may be, for example, used in an ATM or point-of-sale terminals to process credit/debit card information. In another example the device may be used to store and utilize cryptographic keys for applications requiring cryptographic operations (e.g. set-top converter boxes).

Internal mesh grid 104 detects an attempt to physically breach the package from the top to access protected logic 106. External mesh grid 110 detects an attempt to physically breach the package from the bottom (e.g. through circuit board 112.) In an embodiment, external mesh 110 may be built into circuit board 112. In an alternate embodiment, external mesh 110 is built into a bottom portion of the package of an IC. Both internal grid 104 and external grid 110 may comprise multiple grids on different layers of circuit board 112 or different layers on a bottom portion of a package of an IC. External mesh 110 also detects an attempt to read pins of IC 108 by breaching circuit board 112 from the bottom. For example, in machines such as an ATM machine or a credit card reader, a hacker may attempt to read credit card information being transmitted to an IC that includes protected logic 106. The hacker may do so by drilling into circuit board 112 to access pins of the IC. Alternatively, a hacker may attempt to read data in protected logic 106 by drilling into the IC from the top of its package. Internal mesh grid 104 and/or external mesh grid 110 provide protection against hacking of protected logic 106 or access to pins of an IC encapsulating protected logic 106. Circuits and control logic for internal mesh grid 104 and external mesh grid 110 are described in further detail below. These circuits may be part of, or external to, protected logic circuits 106.

Figure 2:
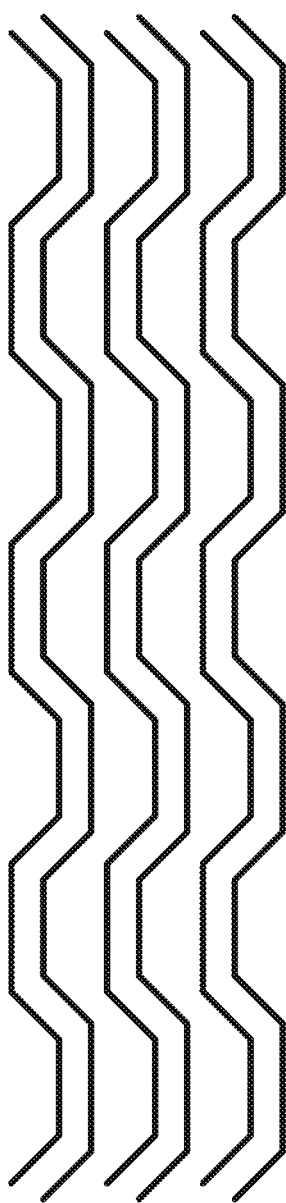
FIG. 2 depicts an exemplary mesh grid layout.

FIG. 2 depicts an exemplary mesh layout 200 according to an embodiment of the disclosure. Mesh layer layout 200 may be used for both internal mesh grid 104 and/or external mesh grid 110. Although mesh layer 200 is depicted as a series of serpentine lines, a person of skill in the art would recognize that any configuration could be used for the protection mesh. In addition, the protection mesh may include any number and density of lines.

Figure 3:
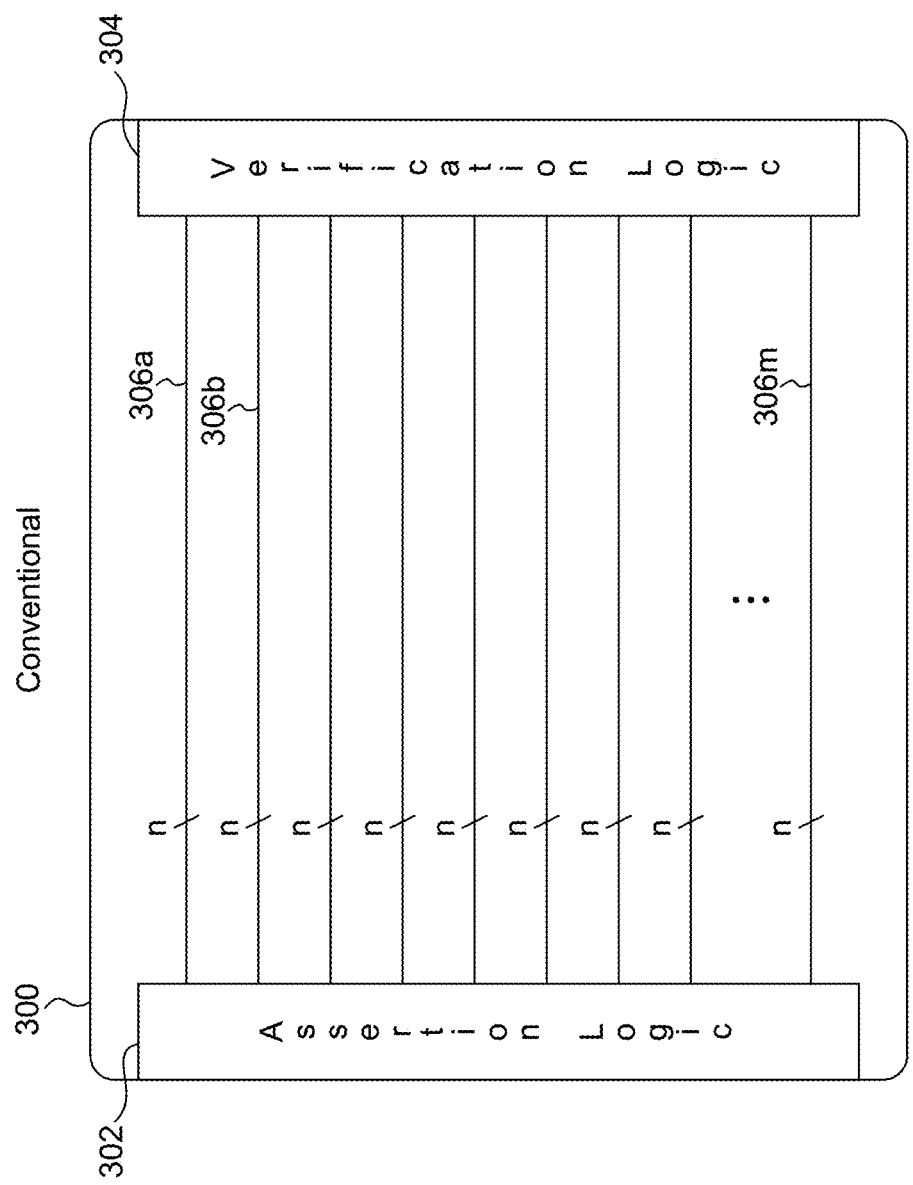
FIG. 3 illustrates an example mesh grid protection system.

FIG. 3 illustrates an example mesh grid protection system.

In the example in FIG. 3, an IC chip 300 includes assertion logic 302 coupled to verification logic 304 by gridlines 306a-m. Gridlines 306a-m each comprise a bus that is n bits wide, where n is a design choice and may be arbitrary. For example, gridline 306a may be 5 bits wide and n is 5 in this example. In the mesh grid protection system shown in FIG. 3, assertion logic 302 transmits signals on buses 306a-m. Verification logic 304 receives the signals on buses 306a-m and determines whether the signals transmitted by assertion logic 302 match signals received by verification logic 304. In an example, verification logic 304 may independently generate the signals generated by assertion logic 302 to determine whether the signals transmitted on buses 306 are the same as the signals received by verification logic 304. For example, verification logic 304 may have the exact same circuitry as assertion logic 302 so that it can duplicate the signals that were generated and transmitted by assertion logic 302.

In the event a hacker attempts to access the protected logic circuits 106 beneath the grid lines 306, one or more of the signals received by verification logic 304 would not match the signals transmitted by assertion logic 302, thereby indicating an attempt to access protected logic circuits 106. However, as illustrated in FIG. 4 that is described below, hackers have come up with a means to bypass a mesh grid protection system such as that shown in FIG. 3.

Figure 4:
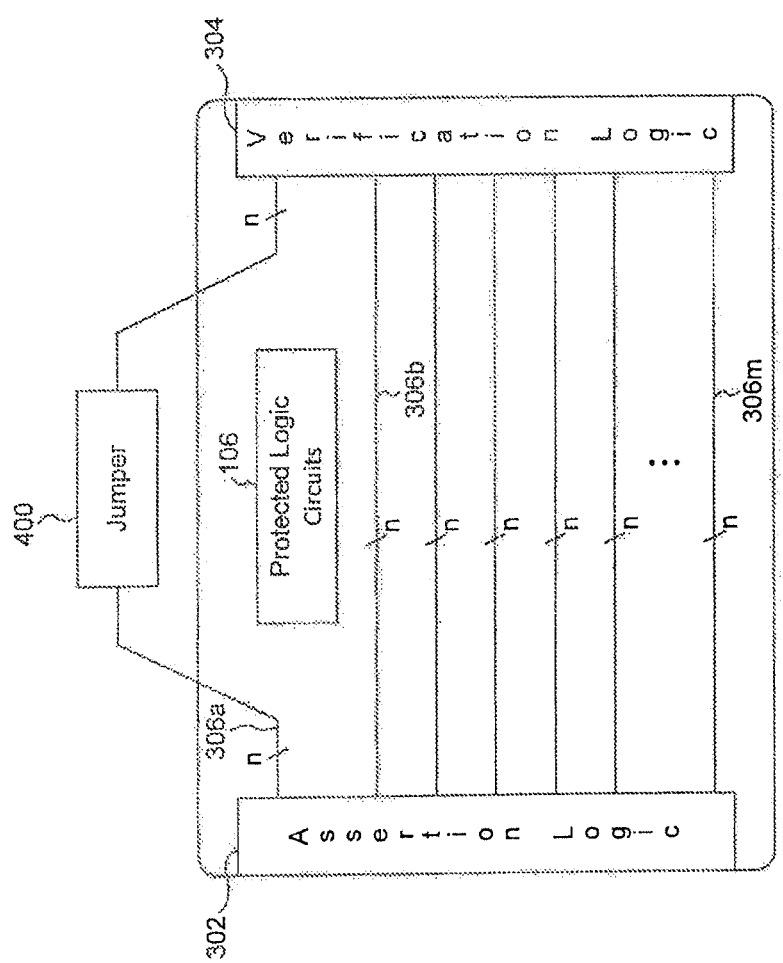
FIG. 4 illustrates an example where a mesh grid has been bypassed.

FIG. 4 illustrates an example of bypassing a mesh grid.

In the example in FIG. 4, a hacker may use a jumper box 400 to bypass a gridline 306. A hacker may cut a gridline, for example gridline 306a, and bypass it using jumper 400. With gridline 306a bypassed, a hacker can access protected logic circuits 106 below that gridline. Similarly, a hacker can cut and bypass any of the buses 306b-m to access the protected logic circuits beneath them. In order to provide a solution that prevents a hacker access to protected logic circuits 106, the embodiments presented below provide exemplary solutions.

Figure 5A:
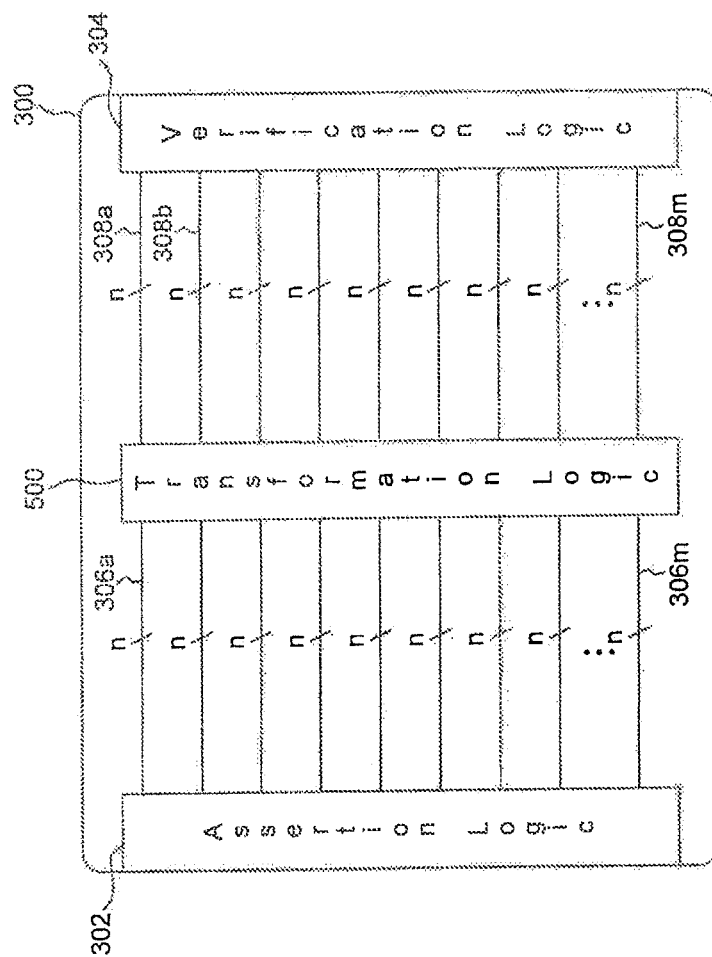
FIG. 5A illustrates an example mesh grid protection system according to an embodiment.

FIG. 5A illustrates an example mesh grid protection system according to an embodiment of the disclosure.

The embodiment shown in FIG. 5A includes assertion logic 302, transformation logic 500, verification logic 304, and gridlines 306a-m and 308a-m (which may be collectively referred to as gridlines 306 and 308 respectively.) Assertion logic 302 is coupled to transformation logic 500 by gridlines 306a-m. Transformation logic is coupled to verification logic 304 by gridlines 308a-m. Gridlines 306 and 308 may be part of one or both of gridlines 104 and gridlines 110.

Assertion logic 302 transmits a first set of signals on gridlines 306a-m. Transformation logic 500 is coupled to the first set of gridlines 306 and receives the first set of signals. Transformation logic 500 transforms the first set of signals to generate a second set of signals. Transformation logic 500 transmits the second set of signals on gridlines 308a-m. Verification logic 304 is coupled to the transformation logic 500 by gridlines 308a-m. Verification logic 304 compares the second set of signals to an expected set of signals to determine whether there is a breach in the mesh grids.

In an example, verification logic 304 may duplicate the first set of signals and the transformation performed by transformation logic 500 on the first set of signals to generate the expected set of signals and verify whether the received second set of signals are the same as the generated expected set of signals. In this example, since verification logic 500 is duplicating signals generated by transformation logic 500, assertion logic 302 may apply the same or different signals on each of buses 306 and transformation logic 500 may apply the same or different transformation on each of the first set of signals received on buses 306.

In another embodiment, assertion logic 306 transmits the same first set of signals on each bus 306 and transformation logic 500 applies the same transformation on each of the buses 308. Thus, each grid line 306 has the same first set of signals and similarly each gridline 308 has the same second set of signals. In this example, verification logic 500 does not duplicate the transformation performed by transformation logic 500 but instead compares the signals between one or more buses 308. Thus, the "expected set of signals" in this case are the signals on each of the other gridlines 308 that a particular gridline is compared to. For example, verification logic 304 may compare a second set of signals received on grid lines 308a to a second set of signals (i.e. the expected set of signal) received on grid lines 308d. Verification logic 304 may thus compare the second set of signals amongst each gridline 308. By comparing the different set of gridlines amongst themselves, the additional cost and chip real estate incurred by duplication of assertion logic 302 and transformation logic 500 in verification logic 304 can be avoided. If the second set of signals on each gridline 308 matches, then there is no breach of the mesh grid. If they do not match, then there is possibly a breach of the mesh grid.

In the event that the second set of signals transmitted by transformation logic 500 is not equivalent to the signals received by verification logic 304, verification logic 304 generates a signal that indicates an attempt has been made to access the protected logic circuits 106 by breaching the mesh grid. In an embodiment, upon detection of a breach in the mesh grid, control logic (not shown) may clear memory (not shown) of the IC and/or cause the IC with protected logic 106 to power down and stop processing data. For example, if the IC stores credit card numbers or cryptographic keys in memory then this data is deleted to ensure that sensitive data is not divulged. It is to be appreciated by persons skilled in the art that mesh grids described herein may be used to protect any type of control logic, integrated circuit or device storing secure or sensitive data.

Figure 5B:
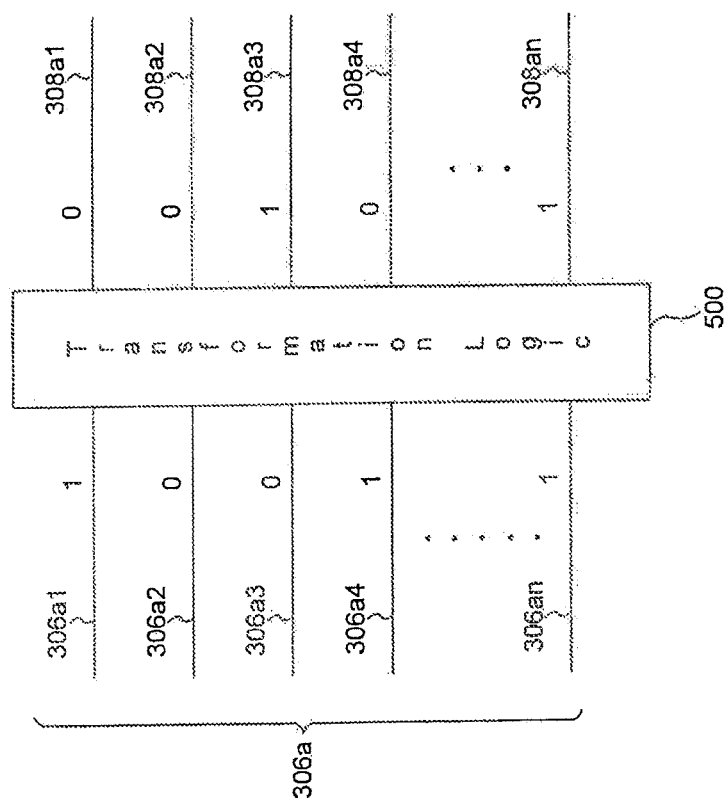
FIG. 5B illustrates an example of a transformation on a gridline according to an embodiment of the disclosure.

FIG. 5B illustrates an example of a transformation on a gridline according to an embodiment of the disclosure.

In an example, gridline 306a is a n bit wide bus that comprises n gridlines 306a1, 306a2-306an. The first set of signals asserted on gridlines 306a1-an may be, for example, bit 1 on gridline 306a1, bit 0 on gridline 306a2, bit 0 on gridline 306a3, bit 1 on gridline 306a4, and bit 1 on gridline 306an. It is to be appreciated that not all the signals on gridlines 306a1-an are shown. Transformation logic 500, based on a transformation function such as that shown in FIGS. 6A-B, transforms the signals on lines 306a1-306an and transmits the transformed signals on the second set of gridlines 308a1-308an. For example, transformation logic transforms the bit 1 on line 306a1 to bit 0 and transmits it on gridline 308a1, leaves bit 0 on gridline 306a2 as it is and transmits the bit 0 on line 308a2, transforms the bit 0 on line 306a3 into a bit 1 and transmits it on line 308a3, transforms bit 1 on line 306a4 to bit 0 and transmits it on gridline 308a4, and leaves bit 1 on 306an unchanged by transmitting bit 1 again on line 308an.

Figure 6A:
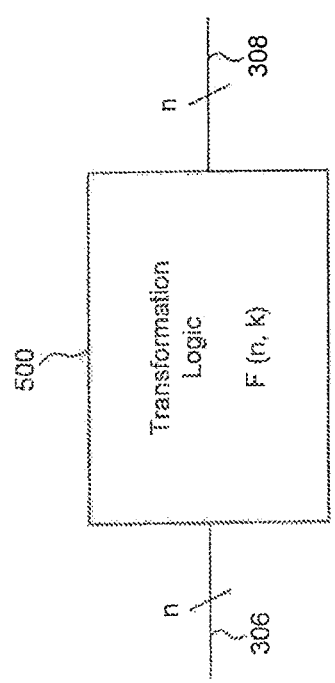
FIGS. 6A-B illustrate an example of transformation logic according to an embodiment of the disclosure.
Figure 6B:
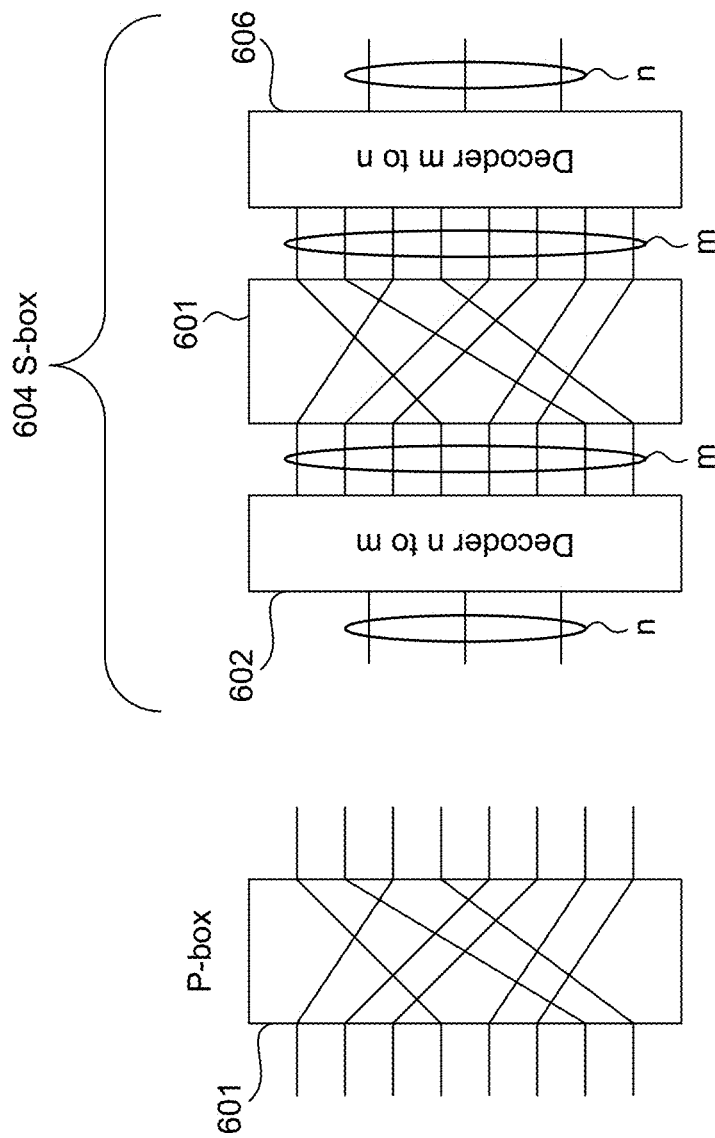

FIGS. 6A-B illustrate an example of transformation logic according to an embodiment of the disclosure. In FIG. 6A, the transformation logic 500 transforms the first set of signals transmitted on a "n" bit-wide gridline 306 into a second set of signals that are transmitted on a corresponding n bit-wide gridline 308 based on a random number (k). In the example in FIG. 6A, transformation logic 500 includes a function F (n, k) that may be any type of transformation function including but not limited to, for example, a substitution box (s-box), a permutation box (p-box), a substitution and permutation box (sp-box), or a cryptographic algorithm. It is to be appreciated that the transformation logic 500 may be any type of circuit, mathematical function, or algorithm that transforms or changes the first set of signals transmitted on a bus 306 and transmits the transformed second set of signals onto bus 308. The random number k may be an input into the transformation logic 500 from a source external to IC 300. In another example, the random number k may be generated within IC 300 or within transformation logic 500 itself. In a further example, the random number k is changed periodically or at random time intervals. The time intervals may be pre-programmed or may be input into transformation logic from a source external to IC 300.

FIG. 6B illustrates an example of a substitution box and a permutation box that may be used to implement transformation logic 500.

FIG. 6B illustrates a p-box 601 and an s-box 604 that includes the p-box 601. P-box 601 shuffles bits to permute or transpose bits across inputs of an s-box thereby retaining diffusion while transposing bits.

In block ciphers, the s-boxes and p-boxes are used to make the relation between the plaintext and the cipher text difficult to understand. P-boxes are typically classified as compression, expansion, or straight based on whether a number of output bits is less than, greater than, or equal to a number of input bits respectively.

The s-box 604 is typically a component of symmetric key algorithms that perform substitution. S-box 604 includes a n-to-m decoder 602, a p-box 601 which is a substitution module, and a m-to-n decoder 606. In block cipher algorithms, an s-box is typically used to obscure the relationship between a key and cipher text. In general, an s-box 604 takes some number of input bits n, and transforms them into some number of output bits m, where n is not necessarily equal to m. For example, decoder 602 transforms n bits into m bits. The m bits are transformed by p-box 601. The decoder 606 transforms the m bits back into n bits. An m×n s-box can be implemented as a lookup table with $2^m$ words of n bits each.

Figure 7:
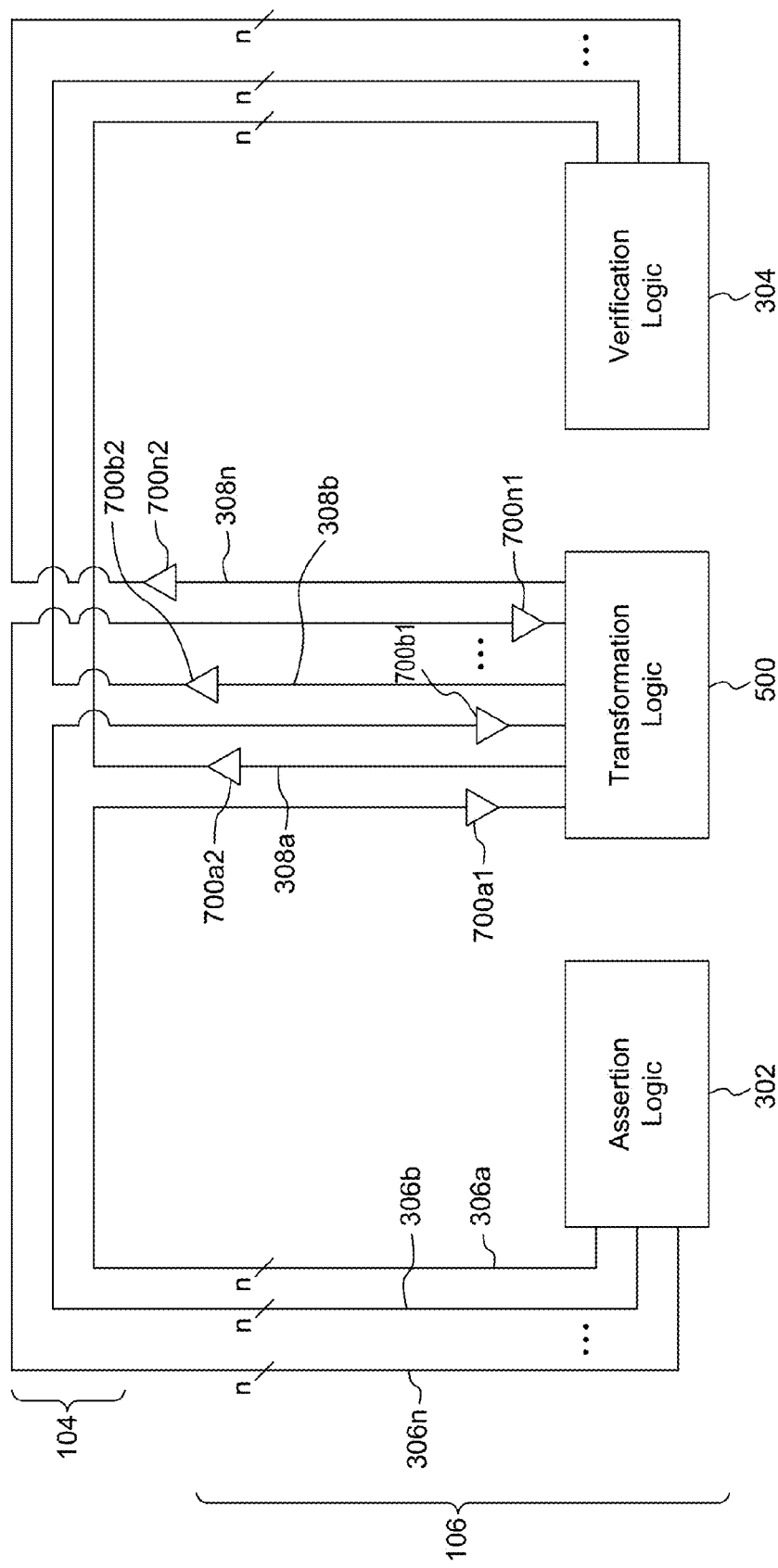
FIG. 7 illustrates an example physical view of a mesh protection grid system according to an embodiment of the disclosure.

FIG. 7 illustrates an example physical view of a mesh grid protection system according to an embodiment of the disclosure.

As shown in FIG. 7, assertion logic 302 asserts the first set of signals on the first set of gridlines 306a-n. The first set of signals on gridlines 306a-n is fed into corresponding drivers 700a1-n1. Transformation logic 500 transforms the first set of signals on the first set of gridlines 306a-n to generate the second set of signals. Transformation logic 500 transmits the second set of signals via drivers 700a2-n2 to verification logic 304 on the second set of gridlines 308a-n. In this example, the gridlines 306a-n and 308a-n are part of internal mesh grid 104 and the circuitry, such as assertion logic 302 to assert the signals, transformation logic 500 to transform the signals, drivers 700, and verification logic 304 to verify the signals, may be part of the protected logic circuits 106. Gridlines 306 and 308 can be part of external mesh grid 110 as well.

Figure 8:
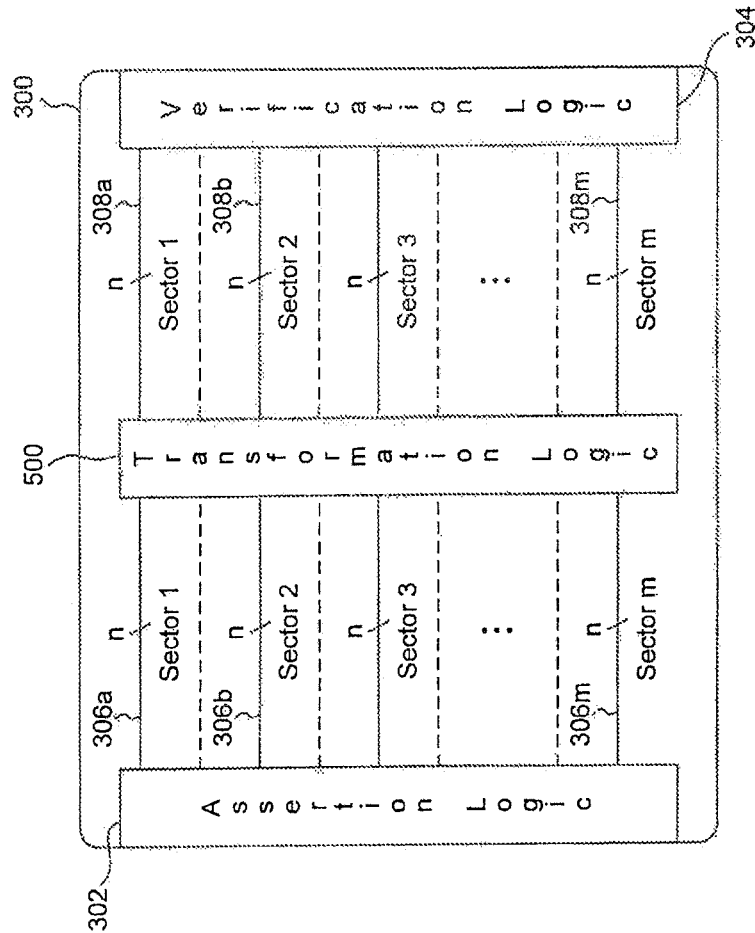
FIG. 8 illustrates an exemplary embodiment for a mesh grid protection system according to an embodiment of the disclosure.

FIG. 8 illustrates an exemplary embodiment for a mesh grid protection system according to an embodiment of the disclosure.

In the example in FIG. 8, the integrated circuit 300 is logically divided into m sectors, each sector corresponding to a gridline 306a-m respectively. In the example in FIG. 8, transformation logic 500 applies the same transformation on each bus 306a-m. As a result each of the gridlines 308a-m also have the same signal. In this example, verification logic 304 can compare the signals amongst the gridlines 308 in the different sectors to determine whether gridlines 308 in each sector have the same signal. For example, the signals on gridline 308a should match the signals on gridlines 308b and the signals on 308b should match the ones on gridlines 308c all across to gridlines 308m. If one of the gridlines 308 does not have the same signal, it may indicate that a breach has occurred.

Figure 9:
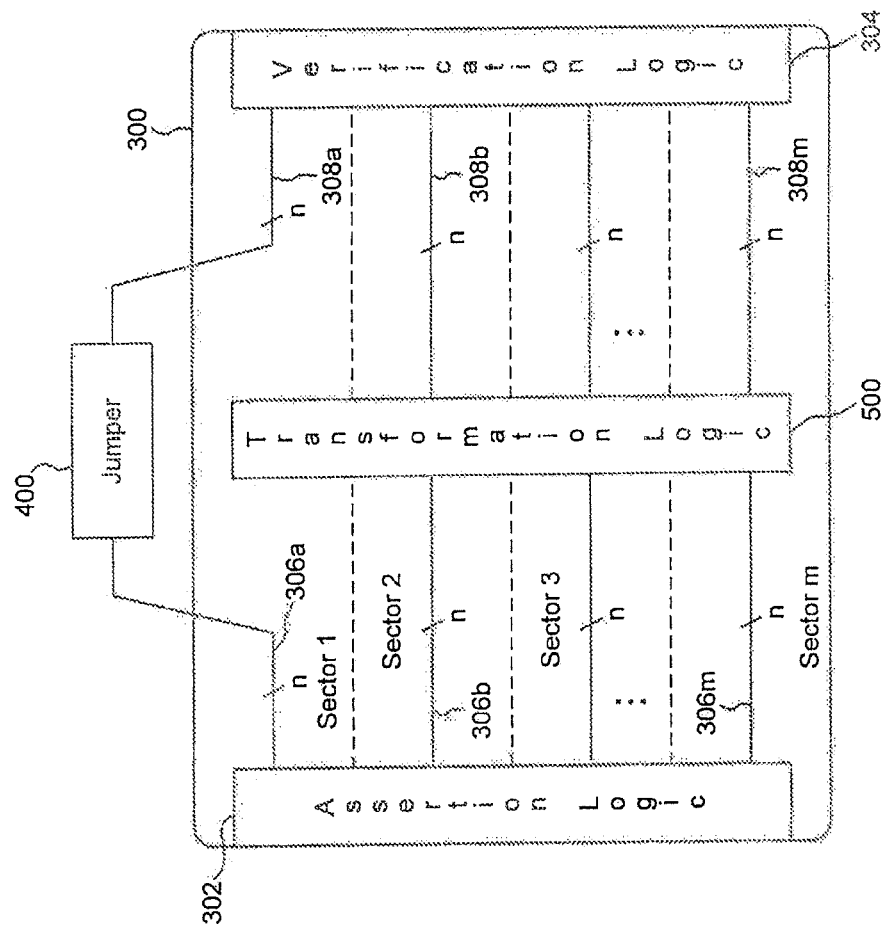
FIG. 9 illustrates an example of an attempt to breach an integrated circuit 300 according to an embodiment of the disclosure.

FIG. 9 illustrates an example of an attempt to breach an integrated circuit according to an embodiment of the disclosure.

In the example in FIG. 9, a hacker may cut a gridline 306a and couple it to jumper 400 to replicate the signal on gridline 306a onto 308a. However, the value replicated by jumper 400 on gridline 306a is the first set of signals and not the second set of transformed signals as transformed by transformation logic 500. Verification logic 304 determines that the signals received on 308a are not the expected second set of signals. Therefore, verification logic 500 determines that there has been a possible breach in sector 1 in an attempt to access the protected logic circuits 106 below gridlines 306a and 308a.

Figure 10:
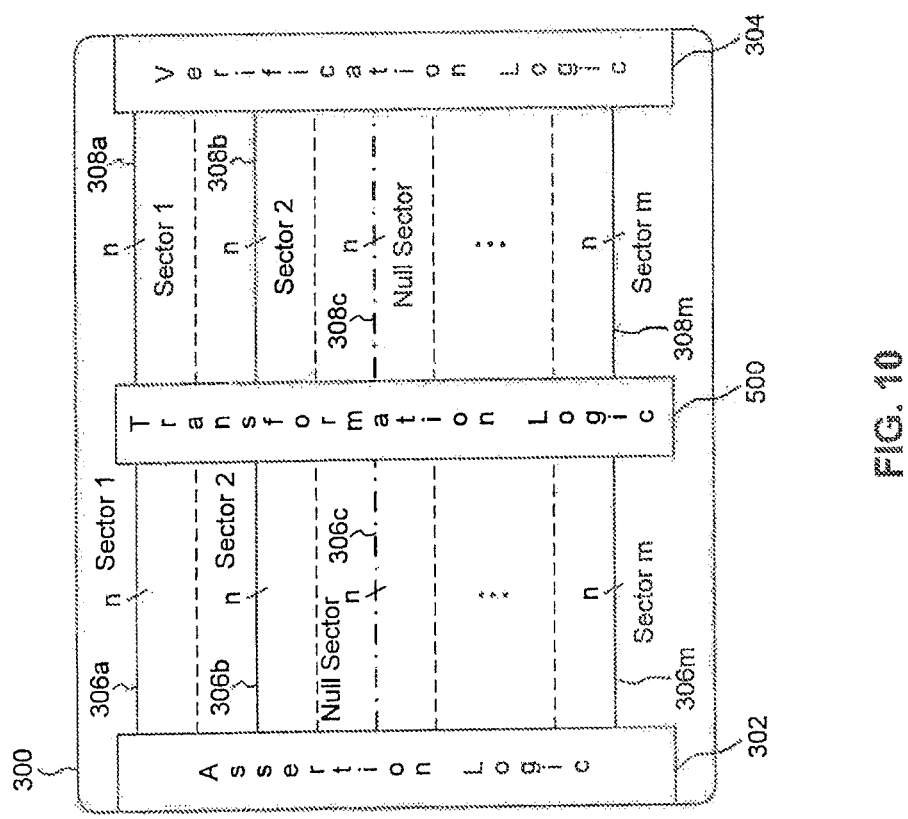
FIG. 10 illustrates an example mesh grid protection system that includes a null sector according to an embodiment of the disclosure.

FIG. 10 illustrates an example mesh grid protection system that includes a null sector according to an embodiment of the disclosure.

In an example, it is possible for a hacker to bypass gridlines 308 such that verification logic 304 finds the same signals on each of the buses 308. The hacker can do this by cutting each gridline 308 and asserting the same signal on all of them. When verification logic 304 compares the signals amongst gridlines 308, it will find the same signal on all of them. To prevent such a scenario, as shown in the example in FIG. 10, the third sector that has buses 306c and 308c is used as a "null sector." A null sector as referred to herein refers to a sector where the gridlines are at a lower layer in chip 300 as compared to other gridlines. For example, in the third sector, which is a null sector, the gridlines 306c and 308c are on a lower layer compared to the gridlines 308a and 306a in sector 1. The gridline 306c has the same first set of signals and undergoes the exact same transformation as gridlines in other sectors to generate the second set of signals that are propagated on gridlines 308c. Gridlines 306c and 308c just happen to be below or at a lower layer compared to the other gridlines and hence are not accessible (and possibly not visible) to a hacker attempting to cut gridlines 306 and 308. The gridlines 306c and 308c in the null sector may not protect any underlying circuits such as protected logic circuits 106. When a hacker bypasses gridlines, for example gridlines 308a-b and asserts the same signal on gridlines 308a-b, the hacker will likely miss gridlines 308c because they are at lower layers. When the signals received on lines 308c are compared to the signals received on other gridlines, for example gridlines 308a-b, it will be possible to detect a breach due to the mismatch with the signals on gridlines 308c. Thus, the null sector protects against multiple identical tampers performed in all sectors except the null sector, which is at a lower layer.

FIGS. 11A and 11B illustrate example implementations of transformation logic according to embodiments of the disclosure.

In FIG. 11A, transformation logic 500 is partitioned into discrete transformation logic blocks 500a-m that correspond to sectors 1-m respectively. For example, sector 1 has transformation logic 500a, sector 2 has transformation logic 500b, and sector m has transformation logic 500m. Each of the transformation logic blocks 500a-m performs the exact same transformation such that the first set of signals on gridline 306 is transformed into a second set of signals on gridlines 308. Thus signals on gridlines 308a-m are exactly the same. This allows verification logic 304 to compare any of the gridlines 308a-m amongst themselves to verify whether there is a breach of the mesh grid.

FIG. 11B illustrates a further embodiment. In this example, transformation logic block 500a from FIG. 11A is divided into multiple transformation boxes 500a1-500ax. Each of the transformation boxes 500a1-ax performs different transformations or performs multiple transformations. For example, transformation box 500a1 may be a cryptographic box, transformation box a2 may be a substitution box and transformation box 500ax may be a permutation box. In the example in FIG. 11B, the exact same sequence of transformations is performed in each sector by transformations boxes 500a-m. The exact same sequence of transformation can be performed in each sector because the transformation boxes in each column, for example transformation boxes 500a1-ml perform the same transformation, thereby guaranteeing that the second set of signals transmitted on each of the gridlines 308a-m are the same.

Figure 12:
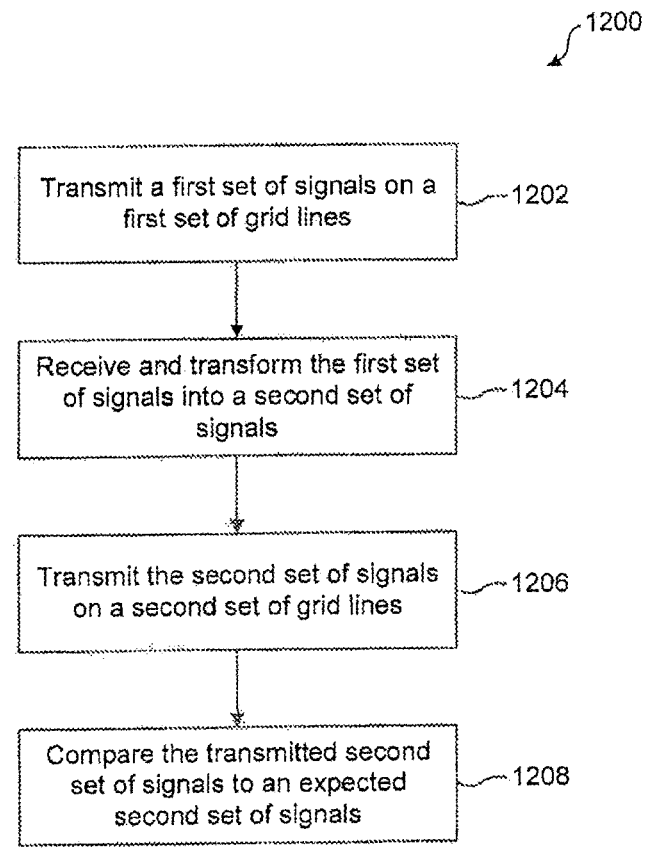
FIG. 12 illustrates an example flowchart illustrating steps performed according to an embodiment of the disclosure.

FIG. 12 illustrates an example flowchart 1200 illustrating steps performed according to an embodiment. Flowchart 1200 will be described with continued reference to the example operating environment depicted in FIGS. 1-11. However, the flowchart is not limited to these embodiments. Note that some steps shown in flowchart 1200 do not necessarily have to occur in the order shown.

In step 1202, a first set of signals is transmitted on a first set of gridlines. For example, assertion logic 302 transmits a first set of signals on a first set of gridlines 306a-m.

In step 1204, the first set of signals are received and transformed into a second set of signals. For example, transformation logic 500 receives the first set of signals on gridlines 306a-m and transforms them into a second set of signals.

In step 1206, the second set of signals are transmitted on a second set of gridlines. For example, transformation logic 500 transmits the second set of signal onto gridlines 308a-m.

In step 1208, the transmitted set of signals are compared to an expected set of signals. For example, verification logic 304 compares the signals on gridlines 308a-m either by replicating the transformation in transformation logic 500 or by comparing gridlines in different sectors to determine whether they have the same signals. If the signals in gridlines 308a-m do not match the expected set of signals, then a breach is indicated.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 13:
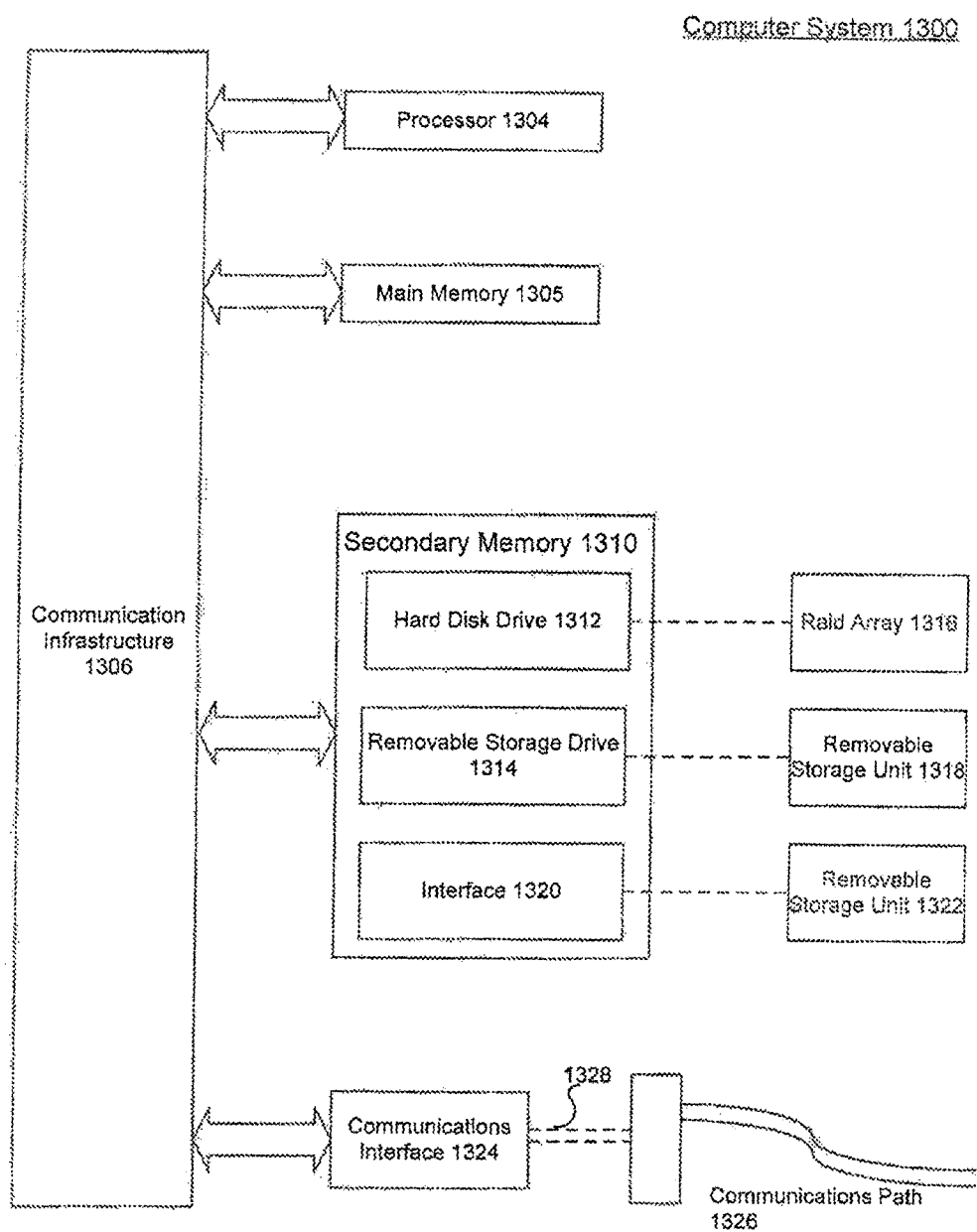
FIG. 13 illustrates a block diagram of an exemplary computer system on which the present embodiments can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 1300 is shown in FIG. 13. The computer system 1300 includes one or more processors, such as processor 1304. Processor 1304 can be a special purpose or a general purpose digital signal processor. The processor 1304 is connected to a communication infrastructure 1306 (for example, a bus or network). Various software implementations are described in terms of this exemplary computer system. After reading this description, it will become apparent to a person skilled in the relevant art how to implement the disclosure using other computer systems and/or computer architectures.

Computer system 1300 also includes a main memory 1305, preferably random access memory (RAM), and may also include a secondary memory 1310. The secondary memory 1310 may include, for example, a hard disk drive 1312, and/or a RAID array 1316, and/or a removable storage drive 1314, representing a floppy disk drive, a magnetic tape drive, an optical disk drive, etc. The removable storage drive 1314 reads from and/or writes to a removable storage unit 1318 in a well-known manner. Removable storage unit 1318, represents a floppy disk, magnetic tape, optical disk, etc. As will be appreciated, the removable storage unit 1318 includes a computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a PCM-CIA slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path 1326. Communications path 1326 carries signals 1328 and may be implemented using wire or cable, fiber optics, a phone line, a cellular phone link, an RF link and other communications channels.

The terms "computer program medium" and "computer usable medium" are used herein to generally refer to media such as removable storage drive 1314, a hard disk installed in hard disk drive 1312, and signals 1328. These computer program products are means for providing software to computer system 1300.

Computer programs (also called computer control logic) are stored in main memory 1305 and/or secondary memory 1310. Computer programs may also be received via communications interface 1324. Such computer programs, when executed, enable the computer system 1300 to implement the present disclosure as discussed herein. In particular, the computer programs, when executed, enable the processor 1304 to implement the processes of the present disclosure. For example, when executed, the computer programs enable processor 1304 to implement part of or all of the steps described above with reference to the flowcharts herein. Where the disclosure is implemented using software, the software may be stored in a computer program product and loaded into computer system 1300 using raid array 1316, removable storage drive 1314, hard drive 1312 or communications interface 1324.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A grid protection system in an integrated circuit chip, the grid protection system comprising:
   a first sector including a first set of grid lines;
   a second sector including a second set of grid lines;
   assertion logic configured to transmit a first set of signals on the first set of grid lines and the second set of grid lines;
   first transformation logic, coupled to the first set of grid lines, the first transformation logic configured to transform the first set of signals to a second set of signals, and to transmit the second set of signals on a third set of grid lines that are coupled to the first set of grid lines;
   second transformation logic, coupled to the second set of grid lines, the second transformation logic configured to transform the first set of signals to a third set of signals, and to transmit the third set of signals on a fourth set of grid lines that are coupled to the second set of grid lines; and
   verification logic, coupled to the first transformation logic and the second transformation logic, configured to compare the second set of signals and the third set of signals.

2. The grid protection system of claim 1, wherein the first transformation logic and the second transformation logic are discrete.

3. The grid protection system of claim 1, wherein the verification logic is further configured to generate a signal to indicate a breach of the grid protection system based on the comparison of the second set of signals and the third set of signals.

4. The grid protection system of claim 3, wherein the verification logic is configured to generate the signal when the second set of signals differs from the third set of signals.

5. The grid protection system of claim 1, wherein the first transformation logic is further configured to transform the first set of signals based on a random number.

6. The grid protection system of claim 5, wherein the random number is changed periodically or at random time intervals.

7. The grid protection system of claim 1, wherein the first transformation logic and the second transformation logic comprises at least one of: a substitution box (s-box), a permutation box (p-box), a substitution and permutation box (sp-box), or a cryptographic algorithm.

8. A method in an integrated circuit chip, the method comprising:
   transmitting a first set of signals on a first set of grid lines located in a first sector of the integrated circuit chip;
   transmitting the first set of signals on a second set of grid lines located in a second sector of the integrated circuit chip;
   transforming the first set of signals on the first set of grid lines to a second set of signals using a first transformation logic located in a first sector;
   transforming the first set of signals on the second set of grid lines to a third set of signals using a second transformation logic located in the first sector;
   transmitting the second set of signals on a third set of grid lines that are coupled to the first set of grid lines;
   transmitting the third set of signals on a fourth set of grid lines that are coupled to the second set of grid lines; and
   comparing the transmitted second set of signals to the transmitted third set of signals.

9. The method of claim 8, further comprising:
   generating a signal to indicate whether there is an attempt to access operational logic based on the comparing.

10. The method of claim 9, wherein the generating comprises:
    generating the signal when the transmitted second set of signals differs from the transmitted third set of signals.

11. The method of claim 8, wherein the transforming the first set of signals on the first set of grid lines comprises:
    transforming the first set of signals on the first set of grid lines based on a random number.

12. The method of claim 8, wherein the transforming the first set of signals on the second set of grid lines comprises:
   transforming the first set of signals on the second set of grid lines based on a random number.

13. The method of claim 11, further comprising:
   changing the random number periodically or at random time intervals.

14. The method of claim 8, wherein the transforming the first set of signals on the first set of grid lines or the transforming the first set of signals on the second set of grid lines comprises:
   transforming the first set of signals using at least one of: a substitution box (s-box), a permutation box (p-box), a substitution and permutation box (sp-box), or a cryptographic algorithm.

15. A grid protection system in an integrated circuit chip, the grid protection system comprising:
   a processor;
   a memory, coupled to the processor, configured to store instructions, when executed by the processor, cause the processor to:
      transmit a first set of signals on a first set of grid lines located in a first sector of the integrated circuit chip;
      transmit the first set of signals on a second set of grid lines located in a second sector of the integrated circuit chip;
      transform the first set of signals on the first set of grid lines to a second set of signals;
      transform the first set of signals on the second set of grid lines to a third set of signals;
      transmit the second set of signals on a third set of grid lines that are coupled to the first set of grid lines;
      transmit the third set of signals on a fourth set of grid lines that are coupled to the second set of grid lines; and
      compare the transmitted second set of signals to the transmitted third set of signals.

16. The system of claim 15, wherein the instructions, when executed by the processor, further cause the processor to generate a signal to indicate whether there is an attempt to access operational logic based on the comparison.

17. The system of claim 16, wherein the instructions, when executed by the processor, cause the processor to generate the signal when the transmitted second set of signals differs from the transmitted third set of signals.

18. The system of claim 15, wherein the instructions, when executed by the processor, cause the processor to transform the first set of signals on the first set of grid lines based on a random number.

19. The system of claim 15, wherein the instructions, when executed by the processor, cause the processor to transform the first set of signals on the second set of grid lines based on a random number.

20. The system of claim 19, wherein the instructions, when executed by the processor, cause the processor to change the random number periodically or at random time intervals.

* * * * *